United States Patent [19]

Asano et al.

[11] 4,141,635
[45] Feb. 27, 1979

[54] MEANS FOR CONTROLLING FILM DRIVE IN CAMERAS

[75] Inventors: Seiji Asano, Okegawa; Tsutomu Hosono, Tokyo, both of Japan

[73] Assignee: Fuji Photo Optical Co., Ltd., Omiya, Japan

[21] Appl. No.: 865,254

[22] Filed: Dec. 28, 1977

[30] Foreign Application Priority Data

Dec. 29, 1976 [JP] Japan .............................. 51-160051

[51] Int. Cl.² .............................................. G03B 1/12
[52] U.S. Cl. .................................................. 354/173
[58] Field of Search ............... 354/170, 171, 173, 204, 354/206, 212, 213

[56] References Cited

U.S. PATENT DOCUMENTS

| | | | |
|---|---|---|---|
| 3,710,705 | 1/1973 | Kimura | 354/171 |
| 4,075,644 | 2/1978 | Hosono | 354/173 |

*Primary Examiner*—Michael L. Gellner

[57] ABSTRACT

In a camera loaded with a 110 type film cartridge a film drive mechanism is provided with a control circuit for controlling a drive motor. In the normal film wind up operation a high voltage is applied to the motor, and after the final frame has been exposed and when the trailing part of the film is being fed, the voltage applied to the motor is lowered by use of a time constant circuit.

6 Claims, 6 Drawing Figures

MEANS FOR CONTROLLING FILM DRIVE IN CAMERAS

BACKGROUND OF THE INVENTION

1. Field of the Invention

This invention relates to control means for a film drive mechanism for a photographic camera, and more particularly to a film drive control means for a camera which is loaded with a 110 type film cartridge.

2. Description of the Prior Art

It is well known in the art to provide a film drive means in a photographic camera for automatically winding up a film in the camera. It is recently desired that the film drive means be incorporated in cameras which are loaded with a 110 type film cartridge. In order to effect an automatic film drive in a camera loaded with an ordinary 35m/m type film magazine, the drive motor in the camera is started by an exposure completion signal and stopped by a one frame feed completion signal. In the camera loaded with a 110 type film cartridge, the motor is stopped by a signal from a senser which engages with a perforation of the film when the film is fed by one frame.

In the camera loaded with the 110 type film cartridge, there is a problem when an automatic film drive means is incorporated. In the 110 type film cartridge, the film retained therein is fed from a film feed-out chamber to a film take-up chamber by way of a film exposure aperture. The film is not secured to a part of the film feed-out chamber and accordingly is completely fed out of the film feed-out chamber and is taken up into the film take-up chamber. However, if the film is completely wound up into the film take-up chamber, the film must be taken out of the film take-up chamber. This is a very troublesome task and one which lowers the working efficiency in a film processing laboratory. Therefore, it is desired that a part of the trailing end of the film remains in the take-up chamber aperture rather than being completely taken up into the film take-up chamber. For the purpose of ensuring the incomplete taking up of the film in the 110 type film cartridge, the film is provided near the trailing end thereof with a film stopping elongated perforation and the film take-up chamber is provided on the inner surface thereof with a film stopper which engages with this elongated perforation of the film when the trailing end of the film approaches the film take-up chamber. In operation, when the film is wound up manually, the user of the camera knows when the film is stopped by the engagement of the perforation and the stopper since the user senses an extraordinarily increased load when attempting to continue winding the film. If the film is automatically wound up by a motor drive means, however, the film will break when the film is forcibly wound up after the elongated perforation has engaged with the stopper or the drive motor will overheat.

SUMMARY OF THE INVENTION

It is, therefore, the primary object of the present invention to provide a film drive control means for a camera loaded with a 110 type film cartridge.

A more specific object of the present invention is to provide a film drive control means for a camera loaded with a 110 type film cartridge in which the film is prevented from being broken or torn even when the drive motor continues to function after the film is stopped in the cartridge.

Another object of the present invention is to provide a film drive control means for a camera loaded with a 110 type film cartridge in which the motor is prevented from overheating even when the drive motor continues to function after the film is stopped in the cartridge.

The above objects of the present invention are accomplished by lowering the torque of the drive motor when the take-up of the trailing part of the film commences. It is sensed automatically that the trailing part of the film has started to be fed by measuring the time during which the film is being fed from one perforation to the next. In order to measure the time, a time constant circuit is provided to detect if the film feeding time is longer than the normal time taken for feeding the film from one frame to the next frame. This is based on the length of the film from the last normal perforation to said elongated perforation being greater than the length of film between the normal perforations.

The present invention will be described in more detail with reference to the accompanying drawings as briefly described below.

DESCRIPTION OF THE PREFERRED EMBODIMENT

Figure 1:
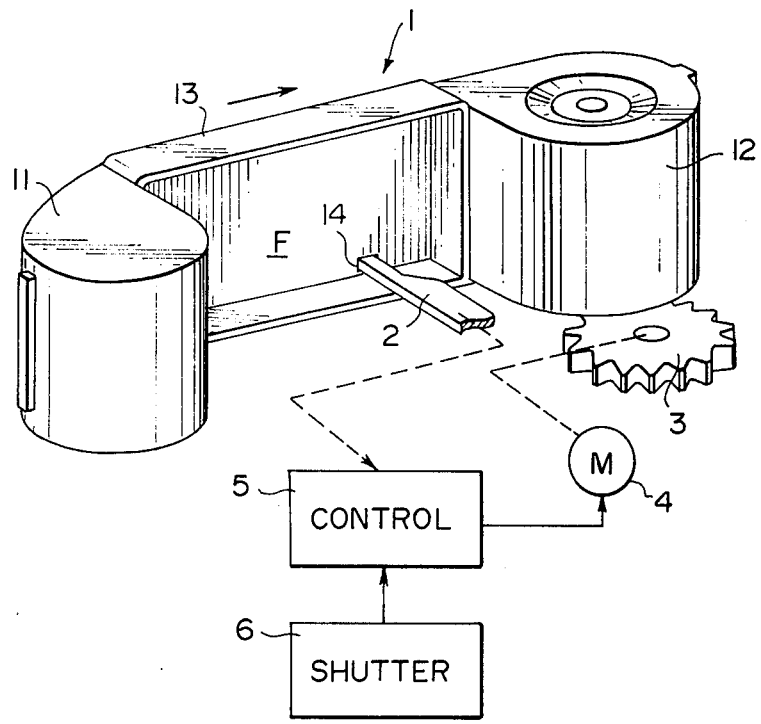
FIG. 1 is a perspective view showing a film drive means for a 110 type film cartridge.

Referring to FIG. 1, a 110 type film cartridge 1 comprises a film feed-out chamber 11 in which an unexposed film is retained, a film take-up chamber 12 into which the film exposed is taken up and a bridge portion 13 extending between the two chambers 11 and 12 and having a film exposure aperture. The film F is fed out of the film feed-out chamber 11 and wound up in the film take-up chamber 12 by way of the bridge portion 13. Within the film take-up chamber 12 is rotatably provided a film take-up spool for taking up the film thereon and the lower end of the film take-up spool (not shown) is secured to a take-up gear (not shown) which is exposed on the outer face of the bottom of the film take-up chamber 12. The gear is meshed with a film wind up gear 3 provided in the camera. A perforation sensor 2 is provided in the camera to sense perforations of the film F. The sensor 2 is, for instance, retracted from the film F when an exposure is completed to allow the film to be fed. After the film F has been fed a predetermined length, the sensor 2 is put into contact with the surface of the film F under a light pressure to wait for the next perforation. When the perforation 14 of the film F is brought up to the position of the sensor 2, the sensor 2 falls into the perforation 14. Thus, the position of the perforation 14 is detected and a sensing signal is transmitted to a control unit 5 of a drive motor 4. When the sensing signal is transmitted to the control unit 5, the control unit 5 operates to stop the drive motor 4. A shutter release means 6 is connected with the control unit 5 so as to have the control unit 5 start the motor 4 when the shutter release has been completed and the exposure is finished. Thus, when the exposure has been completed, the sensor 2 is retracted from the film F and the film drive motor 4 is started to advance the film F.

Figure 2:
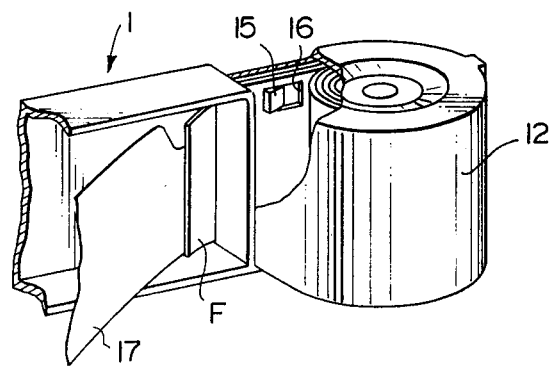
FIG. 2 is a partly broken perspective view of a 110 type film cartridge.

Referring to FIG. 2, the 110 type film cartridge 1 is provided with a stopper 15 on the inner surface of the film take-up chamber 12 at a position where an elongated perforation 16 provided in the trailing part of the film F is brought into engagement therewith. The film F retained in the 110 type film cartridge 1 is provided with a backing paper 17. The backing paper 17 should be wound up in the film take-up chamber 12 together with the film F. In order to assure that the exposed film F is sufficiently wound up together with the backing paper 17, it is desired that the film F be taken up sufficiently as far as the position where the elongated perforation 16 of the film F engages with the stopper 15.

Figure 3:
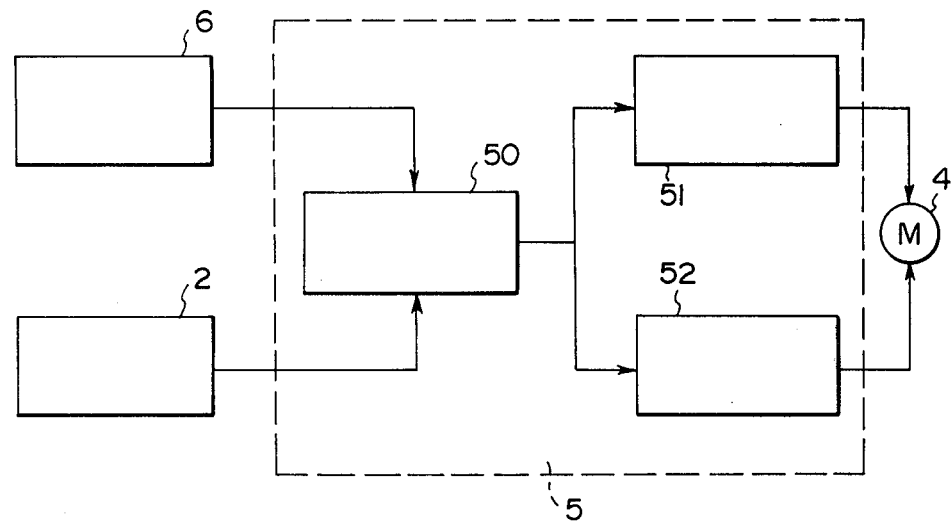
FIG. 3 is a block diagram which shows the structure of a film drive control means in accordance with the present invention.

Referring to FIG. 3, the film drive means in accordance with the present invention is provided with a control unit 5 for controlling the film wind-up torque of the motor 4, said control unit 5 comprising a control circuit 50 and a pair of drive portions 51 and 52. The pair of drive portions 51 and 52 consists of a first drive portion 51 which supplies a comparatively high voltage to the motor 4 for causing the motor 4 to rotate with a comparatively high torque and a second drive portion 52 which supplies a comparatively low voltage to the motor 4 for causing the motor to rotate with a comparatively low torque. The control circuit 50 includes time constant circuits for selecting one of the drive portions 51 and 52. The control circuit 50 is connected on the other hand with an exposure mechanism or a shutter release mechanism 6 and a perforation sensor 2 so that the control circuit 50 operates to start the first drive portion 51 when the control circuit 50 has received an exposure completion signal from the shutter release mechanism 6 and to stop the first drive portion 51 when the control circuit 50 has received a film feed completion signal from the perforation sensor 2. When the length of time from the completion of the exposure to the completion of the film feed, namely the time required for advancing the film from one perforation to the next, is not greater than the time determined by a time constant circuit included in the control circuit 50, only the first portion 51 is operated. When a time longer than the said time as determined by a time constant circuit has passed since the completion of the exposure, the second drive portion 52 is operated to drive the motor 4 instead of the first drive portion 51. Therefore, in the latter case the motor 4 is driven with a high torque at the beginning and then driven with a lower torque. Accordingly, when the elongated perforation 16 of the film F comes into engagement with the stopper 15 of the film cartridge 1, the torque of the motor drive is small enough not to break the film F or to cause the motor 4 to overheat.

Figure 4:
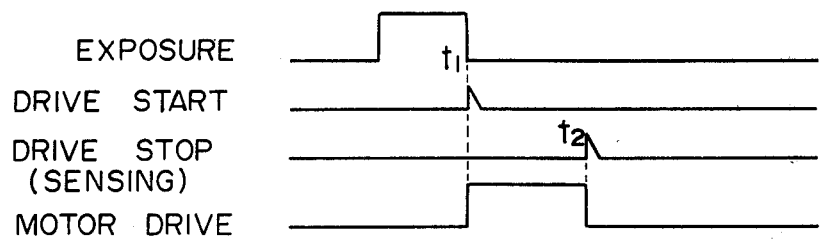
FIG. 4 is a time chart which shows the sequential operation of the film drive control means of the present invention in which the film is normally fed from frame to frame.
Figure 5:
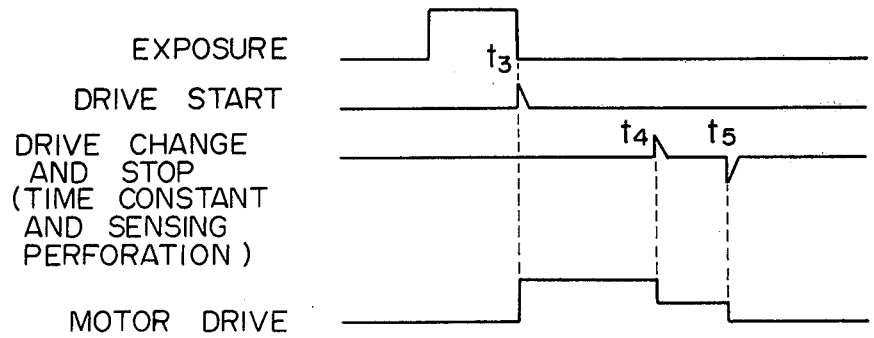
FIG. 5 is a time chart which shows the sequential operation of the film drive control means of the present invention in which the film is fed from the last normal perforation to the elongated perforation provided in the trailing part of the film for stopping the film.

The above described operation will hereinbelow be described in detail with reference to FIGS. 4 and 5. FIG. 4 shows the normal feed and FIG. 5 shows the final feed of the film in a camera loaded with 110 type film in accordance with the present invention. Referring to FIG. 4, when the exposure is completed at time $t_1$, a drive start signal is transmitted from the shutter release mechanism 6 to the control circuit 50, and when the sensor 2 has sensed the perforation 14 at time $t_2$ a drive stop signal is transmitted from the sensor 2 to the control circuit 50. Between the times $t_1$ and $t_2$, the drive motor 4 is driven to advance the film F in the film cartridge 1. In this operation, the first drive portion 51 only is operated to energize the motor 4. Referring to FIG. 5, when the exposure is completed at time $t_3$, a drive start signal is transmitted from the shutter release mechanism 6 to the control circuit 50, and when the length of time as determined by a time constant circuit included in the control circuit 50 has passed after the drive start signal was received by the control circuit 50 a drive portion switching signal is generated in the control circuit 50 at time $t_4$, and then when another time determined by another time constant circuit in the control circuit 50 has passed at time $t_5$ and a drive stop signal is transmitted from the sensor 2 to the control circuit 50. Between the times $t_3$ and $t_4$, the drive motor 4 is driven to advance the film F with a comparatively large torque through the first drive portion 51 and between the times $t_4$ and $t_5$ the drive motor 4 is driven to advance the film F with a comparatively small torque through the second drive portion 52.

It should be noted that the structure of the drive control means is not limited to the embodiment as shown in FIG. 3 because the two drive portions 51 and 52 which are selectively operated to drive the motor 4 may be replaced by a main drive portion and an additional drive portion in which only the main drive portion is used to drive the motor with a comparatively small torque and both the main and the additional drive portions are used to drive the motor with a comparatively large torque.

An example of the electric circuit used for the film drive control means in accordance with the present invention will hereinbelow be described in detail with reference to FIG. 6.

Figure 6:
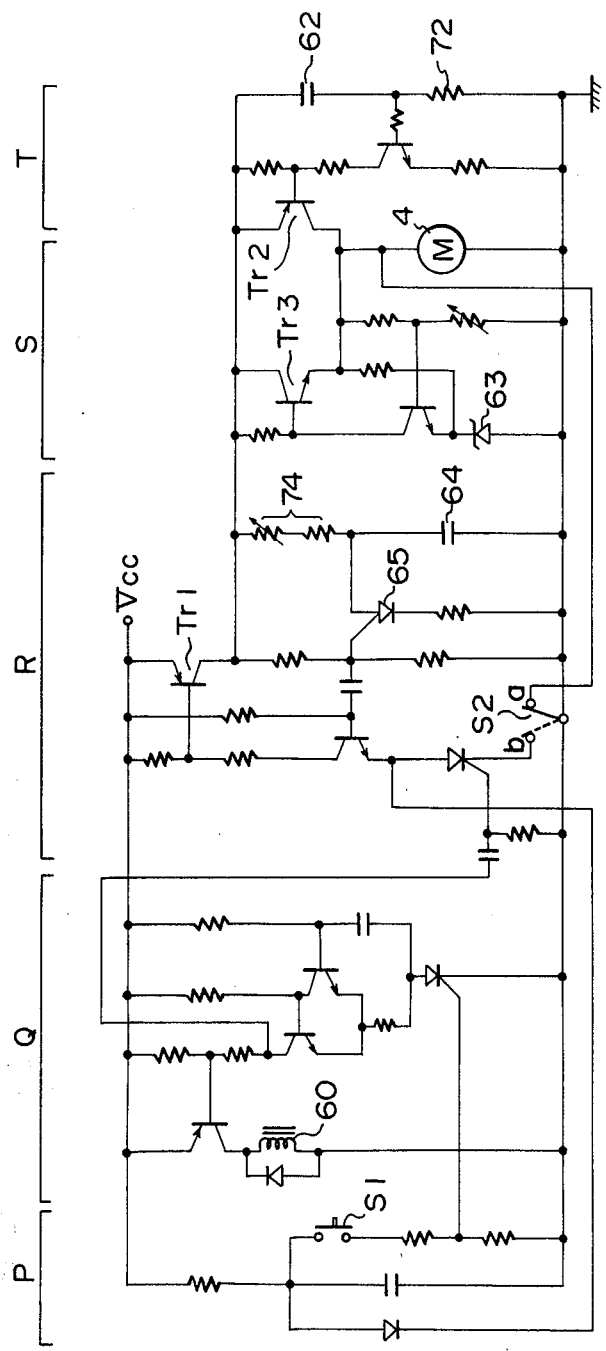
FIG. 6 is a circuit diagram which shows an example of an electric circuit embodying the present invention.

Referring to FIG. 6, the circuit consists of a start switch portion P, a magnet control portion Q, a motor control portion R, a constant voltage supply portion S, and a full voltage supply portion T which are connected in this order as shown. When a shutter release button S1 is depressed to take a picture, a solenoid 60 is energized and a mirror (not shown) is swung up and the film F in the camera is exposed by means of an exposure control circuit (not shown). Then, the solenoid 60 is deenergized. When the exposure is completed, the sensor 2 is retracted from the perforation 14 of the film to a retracted position. In response to the retracting motion of the sensor 2, a change-over switch S2 is moved from terminal a to terminal b. Therefore, upon completion of the exposure, transistor Tr1 is turned ON and transistors Tr2 and Tr3 are turned ON to drive the motor 4. Thus, the film F is advanced and upon detection of the perforation 14 by the sensor 2 the change-over switch S2 is moved from terminal b to terminal a, and accordingly the motor 4 is stopped to complete the feed of the film F by one frame.

On the other hand, when the film F is advanced beyond the last normal perforation 14, the sensor 2 does not sense a perforation. In this case, the change-over switch S2 keeps its position in terminal b. While the film F is being advanced in this case, a capacitor 62 in the full voltage supply portion T which constitutes a time constant circuit is charged up and transistor Tr2 is turned OFF. Therefore, the motor 4 is driven with a power provided only by transistor Tr3. The voltage impressed at this stage is determined by a constant voltage diode 63 connected with the emitter of transistor Tr3. Thus, the torque of the motor 4 is lowered in this case. Then, when another capacitor 64 of another time constant circuit consisting of the capacitor 64 and a resistor 74 is charged up, a PUT (programmable unijunction transistor) 65 is turned ON and the gate potential thereof is instantaneously dropped. Transistor Tr1 is turned OFF thereby and the motor 4 is stopped. The time constant of the former time constant circuit consisting of capacitor 62 and resistor 72 is made smaller than that of the latter time constant circuit consisting of capacitor 64 and resistor 74.

We claim:
1. In a film drive means in a photographic camera adapted to be loaded with a film cartridge of the type having a film feed-out chamber, a film take-up chamber and a bridge portion extending between the chambers, said film drive means comprising a film drive motor for driving a film wind-up mechanism in the camera for winding up the film in the film feed-out chamber onto a film take-up spool in the film take-up chamber; a sensing means for sensing a perforation of the film and generating a signal indicative of the completion of the film feed when the film has been fed by one frame; a shutter means which generates a signal indicative of the completion of the exposure of the film; and an operating means connected with the sensing means, the shutter means and the film drive motor for operating the drive motor in accordance with the signals given thereto from the sensing means and the shutter means thereby to start the drive motor upon receipt of the exposure completion signal and stopping the drive motor upon receipt of the film completion signal;

a control means for controlling the operation of said operating means which comprises means for lowering the torque of the drive motor when a predetermined time has passed since the drive motor was started, said predetermined time being longer than the time for feeding the film from one frame to another.

2. A control means for a film drive means in a photographic camera as defined in claim 1 wherein said control means comprises a time constant circuit, a first drive means which operates to drive the motor with a first torque, a second drive means which operates to drive the motor with a second torque lower than said first torque, and a switching means for switching the first drive means to the second drive means when a time determined by the time constant circuit has passed since the motor was started.

3. A control means for a film drive means in a photographic camera as defined in claim 2 wherein said first drive means and said second drive means are separate drive circuits.

4. A control means for a film drive means in a photographic camera as defined in claim 2 wherein said first drive means comprises two drive circuits and said second drive means comprises one of said two drive circuits.

5. A control means for a film drive means in a photographic camera as defined in claim 1 wherein said control means further comprising means for stopping the drive motor when another predetermined time has passed since the drive motor was started, said other predetermined time being longer than said predetermined time and not shorter than the time for feeding the film from a first position where the last frame is exposed in said bridge portion of the film cartridge to a second position where the last frame is taken up into the film take-up chamber.

6. A control means for a film drive means in a photographic camera as defined in claim 5 wherein said other predetermined time is longer than the time for feeding the film from said first position to a third position where the film is stopped in the film cartridge.

* * * * *